Nov. 24, 1959  J. T. PATRICK ET AL  2,914,291
RECEPTACLE AND DUMPING MEANS
Filed Sept. 3, 1957  3 Sheets-Sheet 1

INVENTORS
James T. Patrick
Thomas J. Long
BY Bacon & Thomas
ATTORNEYS

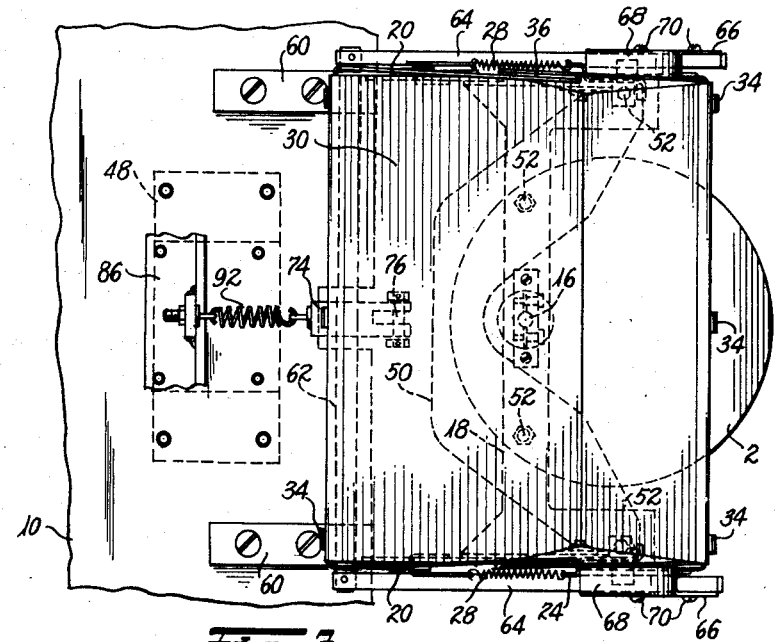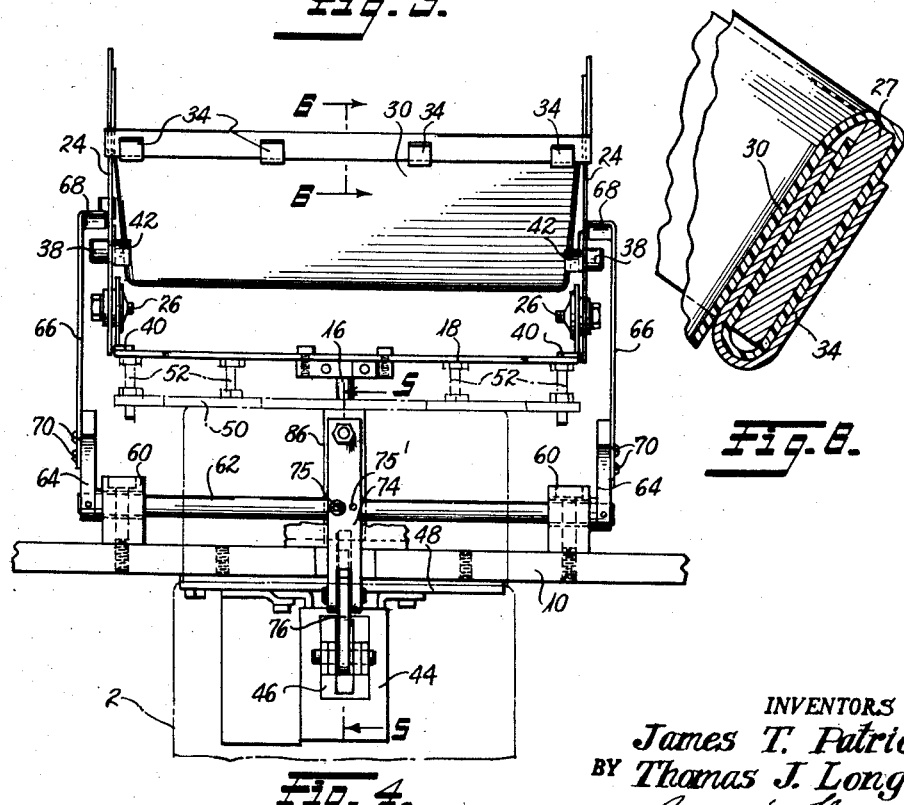

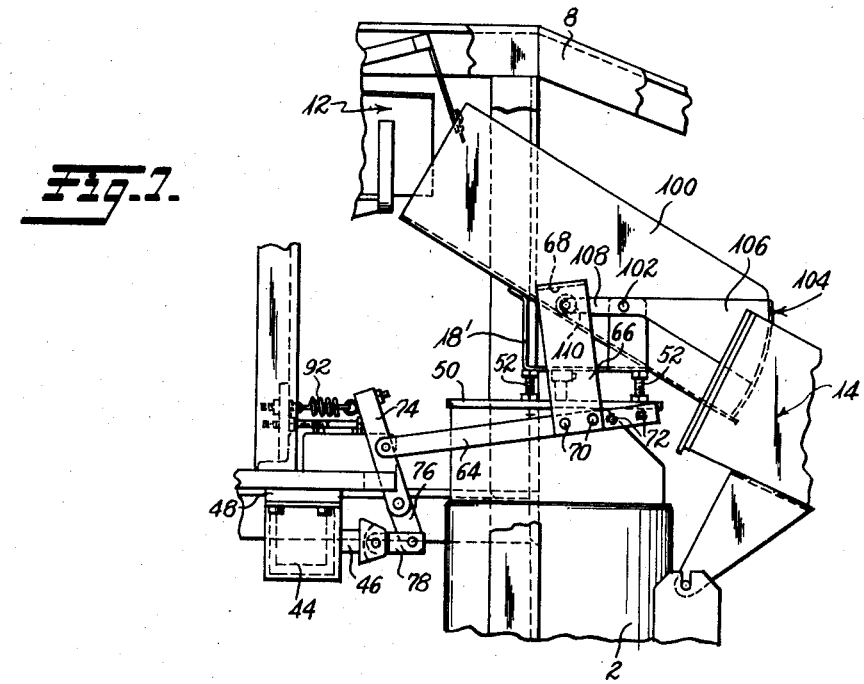
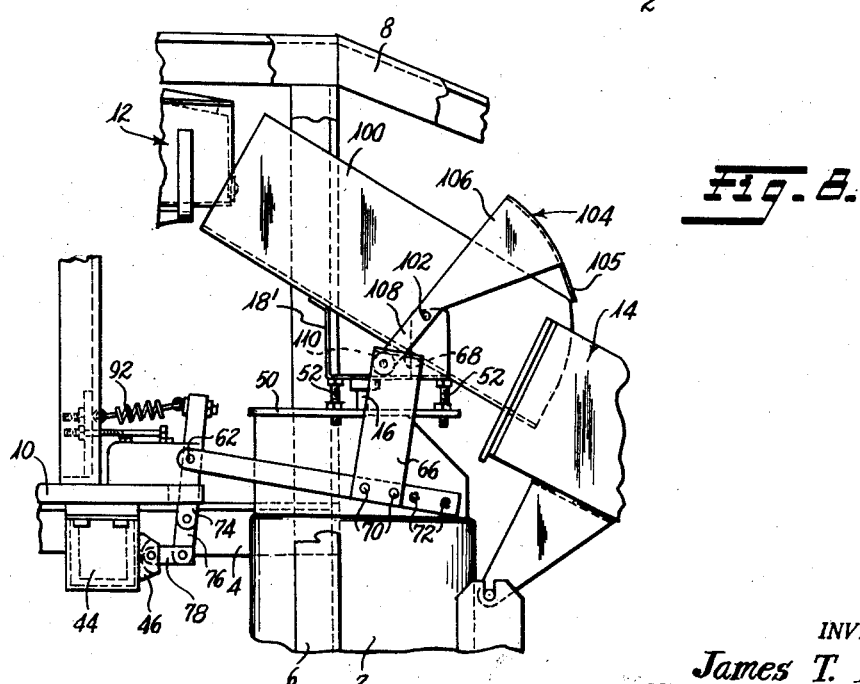

United States Patent Office 2,914,291
Patented Nov. 24, 1959

2,914,291

RECEPTACLE AND DUMPING MEANS

James T. Patrick and Thomas J. Long, Durham, N.C., assignors to Sperry Rand Corporation, Durham, N.C., a corporation of Delaware Application September 3, 1957, Serial No. 681,563

14 Claims. (Cl. 249—16)

This invention relates to novel receptacle structure and dumping means therefor for use in material-handling apparatus, and particularly adapted for use in a weighing machine.

In general the invention comprises, by way of example, a weighing machine having a fixed frame portion and a vertically movable element movable under the influence of weight placed thereon. The invention particularly relates to receptacle means to be carried by the weight-responsive movable element and means carried by the machine frame to effect dumping of a weighed charge of material or product from the receptacle. The receptacle is of a type wherein material is discharged therefrom by the action of gravity, the receptacle having a sloping bottom when in dumping condition and including release means arranged to prevent flow of material therefrom during a weighing cycle. The release means of the receptacle are movably mounted on the movable element and all portions thereof are vertically movable with the element during weighing movements. The dumping mechanism comprises a power means mounted on the machine frame and having an element movable along a path to engage and move the release means to place the receptacle in product dumping condition. The dumping means carried by the frame are normally held in an inactive position completely out of engagement with any portion of the receptacle or its release means whereby the receptacle may move vertically, with complete freedom, through its complete range of weighing movement without interference from the dumping means.

A novel form of receptacle comprises a flexible sheet of material with rigid supporting means at opposite ends thereof, those supporting means being relatively movably mounted on the weighing element from a first position wherein the material assumes a baglike form to receive and retain material to be weighed to a second position wherein the flexible material is held in taut condition with a free discharge edge thereof positioned at an elevation below the other end whereby the product is free to flow therefrom. The invention also includes novel structural features of both the receptacle and dumping means.

It is therefore an object of this invention to provide material-handling apparatus including a movable receptacle and means for dumping material therefrom, which means are normally out of engagement with all portions of the receptacle.

Another object of the invention is as set forth above wherein the dumping means is adjustably adaptable to cooperate with different types of receptacles.

It is still another object of this invention to provide a receptacle for a weighing apparatus wherein the receptacle is made of flexible material.

A further object is as set forth above and further to provide a novel dumping arrangement for the flexible receptacle.

A still further object of the invention is to provide a novel receptacle for a weighing apparatus wherein the receptacle is particularly adapted for the handling of fragile materials.

An additional object is to provide a novel weighing receptacle of extreme simplicity of construction, economical to manufacture, and reliable in operation.

Other objects and advantages will become apparent to those skilled in the art as the description proceeds in connection with the accompanying drawings, wherein:

Fig. 4 is an end elevational view of the structure of Fig. 3, as viewed from the righthand end thereof;

Fig. 5 is an enlarged fragmentary sectional view taken substantially along the line 5—5 of Fig. 4;

Figures 1, 2, 3:
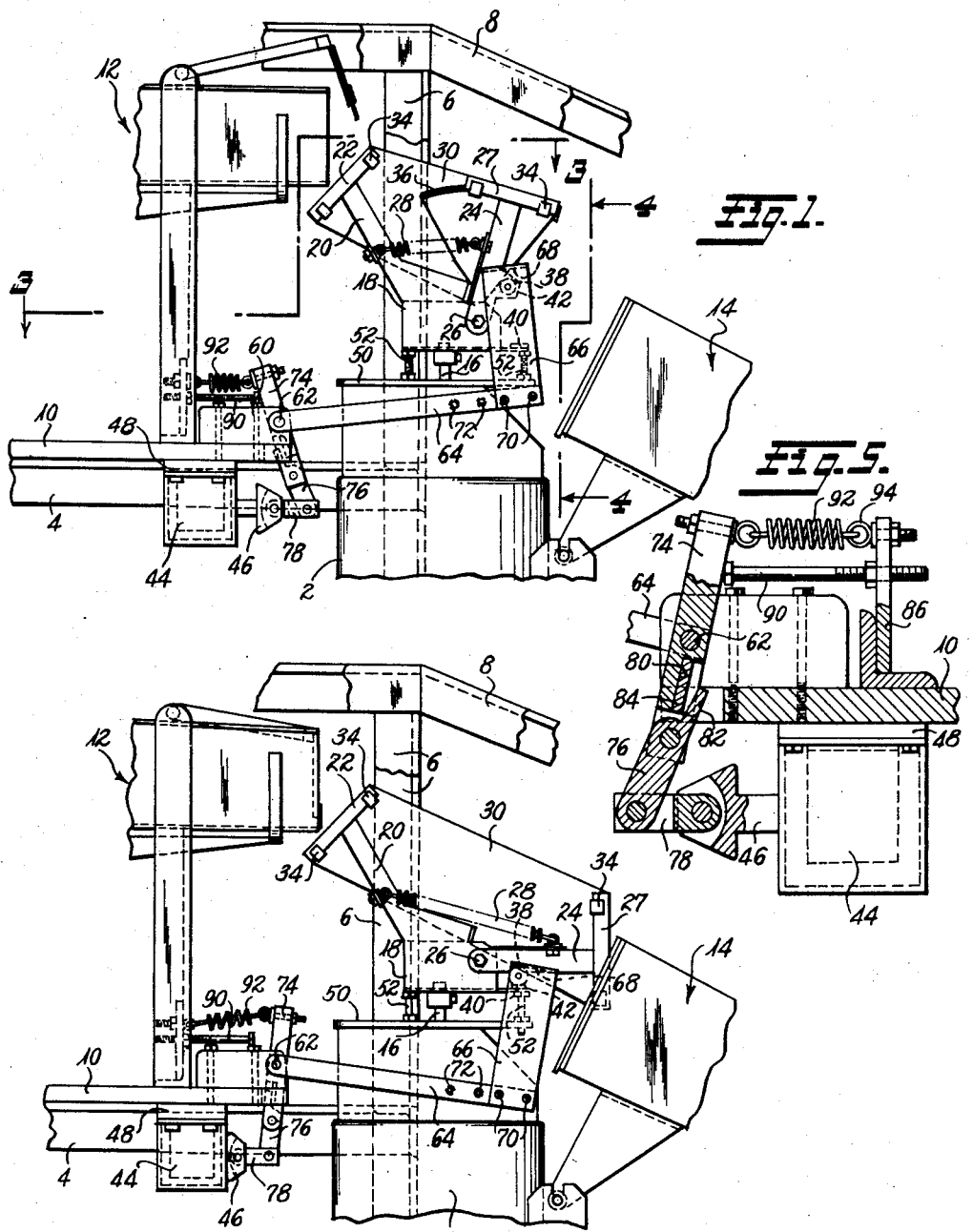
Fig. 1 is a side elevational view of a portion of the weighing apparatus embodying one form of the present invention.
Fig. 2 is a view similar to Fig. 1 but showing the parts in different relative positions.
Fig. 3 is a top plan view of those portions of Fig. 1 constituting the present invention.

Fig. 6 is an enlarged fragmentary sectional view taken substantially along the line 6—6 of Fig. 4; and Figs. 7 and 8 are views, corresponding to Figs. 1 and 2, but showing a different form of material-receiving receptacle.

Referring first to Fig. 1, the weighing machine shown therein comprises a stationary tank 2 which may be considered, for purposes of this application, to be a portion of a fixed frame including frame members 4, 6 and 8, and frame plate 10 supported by frame members 4. The frame of the machine supports suitable conveyors or feeding mechanism 12 for feeding material to be weighed to the apparatus to be described and suitable conveyors or chutes 14 for receiving a weighed charge of material and directing the same to a suitable packaging or other device.

The tank 2 is part of a known type weigher wherein the tank contains a body of oil or other liquid on which a float member (not shown) is buoyantly supported. The float member is provided with an upstanding shaft 16, or similar element, suitably guided in the upper wall of the tank 2 and constituting a vertically movable weight-responsive element. Obviously, as weight is placed on the element 16, the float within tank 2 drops to a lower position in its supporting liquid, which change of elevation is indicative of the weight supported thereby.

A bracket structure 18 is fixedly mounted on the element 16 and is provided with a pair of fixed, generally upstanding spaced arms 20 at the forward side thereof. The arms 20 are each fixed to corresponding legs of a generally U-shaped rigid frame member 22 whereby that frame member is held in fixed position on the element 16. The bracket 18 further pivotally supports a pair of spaced arms 24 pivoted thereto on an axis defined by pins or the like 26 and each of the arms 24 is, in turn, fixed at its outer end to the leg portions of a second rigid U-shaped frame member 27. A suitable tension spring 28 connects each arm 20 to its corresponding pivoted arm 24 whereby the arms 24 are normally held in the position indicated in Fig. 1 wherein the leg portions of the frame 27 extend toward the upper ends of the leg portions of the frame 22. A sheet 30 of suitable flexible material constitutes the receptacle of this embodiment and is attached to the frames 22 and 27 at its opposite edges. The other edges of the material 30 extend freely between the frames 22 and 27. By reference now to Fig. 6, a portion of the frame 27 is shown and a fragmentary portion of the material 30 is shown as extending along the inner surface of the frame member 27 with its edge folded around that frame member. Spaced U-shaped spring clips 34 clamp the material 30 in the described position around frame member 27 and thus effect securement of an edge of the material 30 to the frame 27. The clips 34 are removable from the frame member 27 to facilitate replacement or repair of material 30. Identical fastening means are employed to secure the material 30 to the frames 22 and 27. The material 30 may be any suitable material but is preferably a stable film of plastic material that is readily bendable and fairly soft, to reduce damage to fragile material handled thereby. A suitable material is polyethylene film, polyester film, or a laminate of both. The sheet of material 30 is cut to such dimensions that, when frame member 27, carried by arms 24, is swung to the position shown in Fig. 2, the sheet of material 30 extends in a taut condition between the frames 22 and 27 to define an upwardly open, substantially straight, U-shaped trough open at its ends. When the frame member 27 is released to the action of spring 28 and moved thereby to the position of Fig. 1, the side wall portions of the flexible trough of Fig. 2 assume a folded condition, indicated at 36 in Fig. 1, whereby the sheet of material 30 "sags" between the frames 22 and 27 and defines a baglike structure adapted to receive and hold material delivered thereto by the feeding mechanism 12. As is obvious, the discharge end portion of the bottom surface of the flexible trough of Fig. 2 extends upwardly when the parts are in the position of Fig. 1 to constitute a restraining wall or closure for the lower end of the receptacle, whereas when the parts are in the position of Fig. 2, the charge of material in the receptacle is free to flow by gravity to the conveyor or chute 14.

The pivoted arms 24 are further provided with outwardly extending projections in the form of rollers 38 offset forwardly and upwardly from the pivots 26 of the arms 24. Further, the bracket 18 is provided with abutments 40 adapted to engage inturned flanges 42 (see Fig. 4) of arms 24 to limit downward pivotal movement of the arms 24 to the position shown in Fig. 2.

A solenoid 44 having a movable armature 46 is mounted on the frame plate 10 substantially midway between the sides of the weighing machine. Preferably, the solenoid 44 is mounted on a plate 48 (see Fig. 4) which, in turn, is fixed on the plate 10.

The frame plate 10 is also provided with a pair of fixed spaced bearing blocks 60 mounted thereon substantially in alignment with the side edge portions of the material-receiving receptacle. A rock shaft 62 is journalled in the bearing blocks 60 to extend therethrough. A lever arm 64 is fixed to each end of the shaft 62, outwardly of bearing blocks 60, and extend generally forwardly therefrom to free ends generally below the rollers 38, previously described. Each of the arms 64 is further provided with an upstanding plate 66 fixed thereto and terminating in an inwardly directed upper flange 68 (see Figs. 1, 2, 3 and 4). The plates 66 are secured to the lever arms 64 by means of screws or the like 70, and the arms 64 are provided with a plurality of threaded openings 72 whereby the plates 66 may be mounted on the arms 64 in a plurality of different longitudinal positions, for a purpose to be described later.

Substantially midway between its ends the shaft 62 is provided with an arm 74 having a downwardly extending bifurcated portion securely fixed to the shaft 62 by set screw 75 and a taper pin 75′ (Fig. 4). A link 76 is pivoted to the arm 74 between the bifurcations thereof (see also Fig. 5) and is, in turn, pivoted to a link 78 pivotally connected to the armature 46 of solenoid 44. Referring now to Fig. 5, it will be seen that the bifurcated arm 74 is provided with a recess 80 in its rear face and that the link 76 is provided with an upstanding finger 82 adapted to swing into and out of recess 80 during relative pivotal movements between arm 74 and link 76. Preferably, the base of the recess 80 is provided with a resilient pad 84 constituting an abutment for engagement by the inner edge of the finger 82, as will be described. As also clearly shown in Figs. 4 and 5, the arm 74 is provided with an upwardly extending portion. The upwardly extending portion defines an abutment engageable with an adjustable stop 90 carried by a bracket 86 on a frame member on plate 10. A tension spring 92 extends from the free end of the arm 74 to an eyelet 94 on the bracket 86 and serves to normally hold the surface arm 74 in engagement with the stop 90 and, therefore, position the arms 64 on shaft 62 at a predetermined angular position. The stop 90 is so adjusted that when the spring 94 holds the arms 64 in the upper position of Fig. 1, the flanges 68 of plates 66 are held a substantial distance above the uppermost position of rollers 38. The space between the flange 68 and the rollers 38, as shown in Fig. 1, is sufficient to permit the material-receiving receptacle to move vertically to its uppermost position, and even slightly thereabove, without engaging the rollers 38 and flanges 68. In other words, the material-receiving receptacle is free to perform all its weight-responsive movements without interference from the dumping mechanism.

The weighing apparatus may and conventionally does include switch means (not shown) operable by downward movement of the element or shaft 16 to a predetermined position to close an external circuit. The switch means referred to are adjusted so that they are closed when the required weight of material has been deposited in the weighing receptacle. Such switch means may be employed to complete a circuit through the solenoid 44 and thus actuate the dumping mechanism.

By reference to Fig. 5, it will be seen that energization of solenoid 44 causes armature 46 to move to the right as seen in that figure, thus swinging link 76 about its pivotal connection to arm 74 in a counterclockwise direction until finger 82 engages the pad or abutment 84. At that time the arm 74 and link 76 become as a rigid member and continued movement of the armature 46 to the right effects swinging movement of the arm 74 and shaft 62 in a counterclockwise direction, against the tension of spring 92. The arrangement thus constitutes a lost-motion device between the armature 46 and arm 74. Such movement continues until the armature 46 has moved through its full range of movement to the right. As the shaft 62 starts to rotate in a counterclockwise direction, as described, the flanges 68 on plates 66 are moved downwardly into engagement with rollers 38 on arms 34 of the receptacle. The weighing apparatus is provided with a suitable stop means, comprising a plate 50 and adjustable stops 52, to limit downward movement of the shaft 16 under the influence of the dumping mechanism by engagement with the bracket 18 (see also Fig. 3). In any event, downward movement of the flanges 68 in engagement with rollers 38 effects pivotal movement of the arms 24 about their pivots 26 to swing the frames 24 to the position shown in Fig. 2 and thereby dump the weighed material from the receptacle into the conveyor or chute 14.

As is well known, the armature 46 of the solenoid 44 responds with extreme rapidity to energization of the solenoid and the provision of a resilient buffer at the abutment 84 serves to prevent damage to the parts upon sudden energization of the solenoid and also provides some "give" or resilience in the system when the element 16 is stopped in its downward movement, as previously described. Preferably, the circuit which energizes solenoid 44 is provided with a time delay mechanism to open that circuit after a period of time sufficient for flow of all of the weighed material from the receptacle. Thereafter the circuit to solenoid 44 is opened independently of the switch means controlled by the movable weighing element 16 and the dumping mechanism is returned to the normal position of Fig. 1, thus readying the receptacle for a further weighing cycle.

Referring now to Figs. 7 and 8, all portions of the apparatus shown in those figures bearing the same reference numerals as corresponding portions of Figs. 1 through 6 are identical thereto. In the embodiment of Figs. 7 and 8, however, the vertically movable weighing element 16 supports a bracket 18′ upon which a rigid U- shaped trough 100 is fixed. The trough 100 is arranged in the sloping attitude shown and both its upper and lower ends are open. The upper end of the trough 100 underlies the material feeding means 12, whereas the lower end thereof overlies the trough or conveyor 14. The lower ends of the side walls of the trough 100 are of arcuate outline concentric to a pivot axis 102 upon which an end closure gate 104 is pivotally mounted. The closure gate 104 comprises an end closure portion 105 and side portions 106 which extend to the pivot axis 102. The sides 106 extend past the pivot axis 102 to define extending arms 108 rearwardly of the pivot 102. Rollers 110 are mounted on the outer faces of the arms 108 at the ends thereof. The dumping mechanism previously described in connection with Figs. 1 through 6 is identical to the dumping mechanism shown in Figs. 7 and 8. In adapting the dumping mechanism to actuate the receptacle of Figs. 7 and 8, the plates 66 were moved inwardly from the ends of the lever arms 64 and secured thereto in the rearmost pair of threaded openings 72 previously described. By this adjustment the flanges 68 were positioned over the rollers 110, which in this embodiment are located farther to the left than were the actuating rollers 38 of Fig. 1. In this embodiment also the arms 64 assume a normal position wherein the flanges 68 are held a substantial distance above the uppermost position reached by the rollers 110 during normal weighing operations. The end closure gate 104 is so proportioned that the weight thereof to the right pivots 102 far exceeds the weight of the arm portions 108 and rollers 110 whereby the closure normally assumes the position shown in Fig. 7 wherein the lowermost end of the trough 100 is closed. In this condition material delivered by the feed means 12 is collected in and retained by the closed trough 100. When the desired weight of material has been deposited in the trough receptacle, the solenoid 44 is energized, as previously described, to swing arms 64 downwardly and thus bring flanges 68 into engagement with rollers 110 and to thereafter swing the closure gate 104 to the open position of Fig. 8 to discharge weighed material into the trough or chute 14.

The switch means (not shown) previously referred to as being actuable by the weighing element 16 to energize solenoid 44, may include switches to effect control of the material feeding means 12.

While a limited number of specific embodiments of the invention have been shown and described herein, it is to be understood that the described embodiments are merely illustrative of preferred forms whereas the invention, as defined by the appended claims, may encompass other modifications.

We claim:

1. In weighing apparatus having a stationary frame and a vertically movable weight-responsive element, a product receiver mounted on said element, said receiver including a sloping bottom for supporting the product and a movable end portion movable from a first position wherein it holds the product in said receiver to a second position wherein it permits the product to flow by gravity from said receiver, means normally holding said portion in said first position, dumping means movably mounted on said frame for generally vertical downward movement along a path passing through the position of a downwardly movable element of said movable portion of said receiver, means normally holding said dumping means spaced above said movable portion throughout the range of weight-responsive movement thereof, selectively operable means for moving said dumping means downwardly to engage and move said movable portion to said second position and cooperating stop means on said frame and receiver for limiting downward movement of said receiver by said dumping means.

2. Apparatus as defined in claim 1 wherein said movable portion is pivotally carried by said receiver said downwardly movable element comprising a projection spaced from the pivotal axis of said movable portion and arranged in the path of movement of said dumping means.

3. Apparatus as defined in claim 1 wherein said receiver comprises a sloping receptacle of flexible material open at its upper and lower ends, said movable portion comprising the lower end portion thereof and supporting means therefor movable from the said first position wherein said material sags between said ends to define a product-retaining receptacle to said second position wherein said material is held substantially taut to permit the product to flow therefrom at said lower end.

4. Apparatus as defined in claim 1 wherein said receiver comprises a rigid receptacle having a sloping bottom surface and open at its upper and lower ends, said movable portion comprising a movable closure for said lower open end.

5. Apparatus as defined in claim 1 wherein said dumping means comprises a lever structure pivoted to said frame at one side of said receiver, an element on said lever structure projecting inwardly toward said receiver, a projection on said movable means below and normally spaced from said element, and means for selectively swinging said lever structure and element downwardly.

6. Apparatus as defined in claim 1 including spring means normally holding said lever structure to position said element in an upper position spaced above the normal range of weight-responsive movement of said projection.

7. Apparatus as defined in claim 1 including a leg fixed to said lever structure, reciprocatory power means on said frame, link means connecting said power means to said leg and wherein said link means includes a lost-motion device and wherein a stop device on said frame limits upward swinging movement of said lever, said lost-motion device including relatively movable engageable elements, one of which comprises a resilient pad.

8. In product-handling apparatus, a product receiver comprising; a structure of flexible sheet material, first means for holding one end of said structure distended to define a product-receiving portion, second means connected to the other end of said structure and movable from a first position spaced from said first means a distance less than the length of said structure to a second position lower than said first means and spaced therefrom a distance equal to the length of said structure, said first means being fixedly mounted on a support and said second means being swingably mounted about a pivot axis on said support below said first means.

9. In product-handling apparatus, a product receiver comprising; a member of flexible sheet material, first and second supporting means secured to opposed edge portions of said member, means mounting said first and second supporting means on a support for relative movement from first relative positions wherein said member sags therebetween to define a product-receiving pocket to second relative positions wherein one of said supporting means is higher than the other with said member held substantially taut therebetween whereby to discharge the product accumulated thereon, and means urging said first and second supporting means to said first relative position.

10. In weighing apparatus having a stationary portion and a movable weight-responsive element, a product receiver on said element comprising; a member of flexible sheet material, first means fixed on said weight-responsive element and holding one end of said member, second means connected to the other end of said member and movably mounted on said weight-responsive element and movable from a first position, wherein said member sags between said first and second means to define a product-receiving pocket, to a second position lower than said first means and wherein said member is held taut to permit the product to gravitate therefrom, means normally urging said second means toward said first position, and selectively operable means on said stationary portion for engaging and moving said second means to said second position.

11. In weighing apparatus having a movable weight-responsive element, a generally trough-shaped sheet of flexible material having a rigid U-shaped frame at each end thereof, one of said frames being fixedly mounted on said element in a generally upright position, and means movably mounting the other of said frames on said element for movement from a first position wherein said material sags between said frames to define a product-receiving receptacle to a second position wherein said other frame is lower than said one frame and said material is taut between said frames.

12. Weighing apparatus as defined in claim 11 wherein said other frame is pivotally supported on said element, and spring means normally holding said other frame in said first position.

13. Weighing apparatus as defined in claim 11 wherein said other frame is so movably mounted that the legs thereof extend toward the upper ends of the legs of said one frame when said other frame is in said first position.

14. Apparatus as defined in claim 1 wherein said receiver comprises an open-ended rigid trough having a sloping bottom and upstanding side walls, said side walls having arcuate end edges at the ends thereof adjacent the lower end of said bottom, said end edges being arcuate about a transverse axis intermediate the ends of said receiver, said movable portion comprising an arcuate closure fitting said end edges and pivotally mounted at the sides of said side walls and on said axis.

References Cited in the file of this patent
UNITED STATES PATENTS

| | | |
|---|---|---|
| 1,078,971 | Thomas | Nov. 18, 1913 |
| 2,327,367 | Nowak | Aug. 24, 1943 |
| 2,466,386 | Curioni | Apr. 5, 1949 |
| 2,483,582 | Hill | Oct. 4, 1949 |
| 2,613,053 | Dorrington et al. | Oct. 7, 1952 |
| 2,626,042 | Aldridge | Jan. 20, 1953 |
| 2,685,441 | Baade | Aug. 3, 1954 |
| 2,726,061 | Schieser et al. | Dec. 6, 1955 |
| 2,760,232 | Rougemont et al. | Aug. 28, 1956 |

FOREIGN PATENTS

| | | |
|---|---|---|
| 456,498 | Italy | Apr. 5, 1950 |